United States Patent Office 3,520,048
Patented July 14, 1970

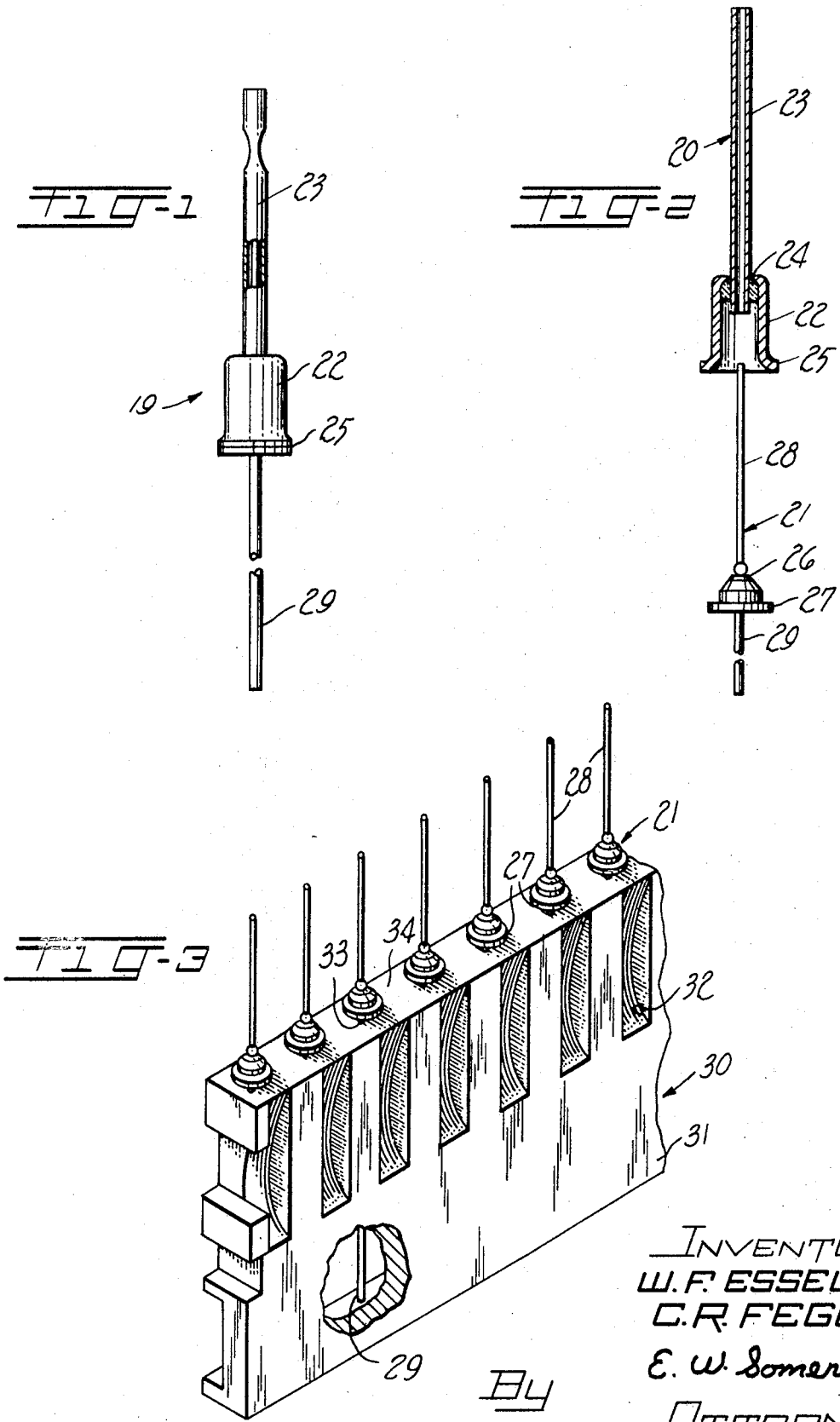

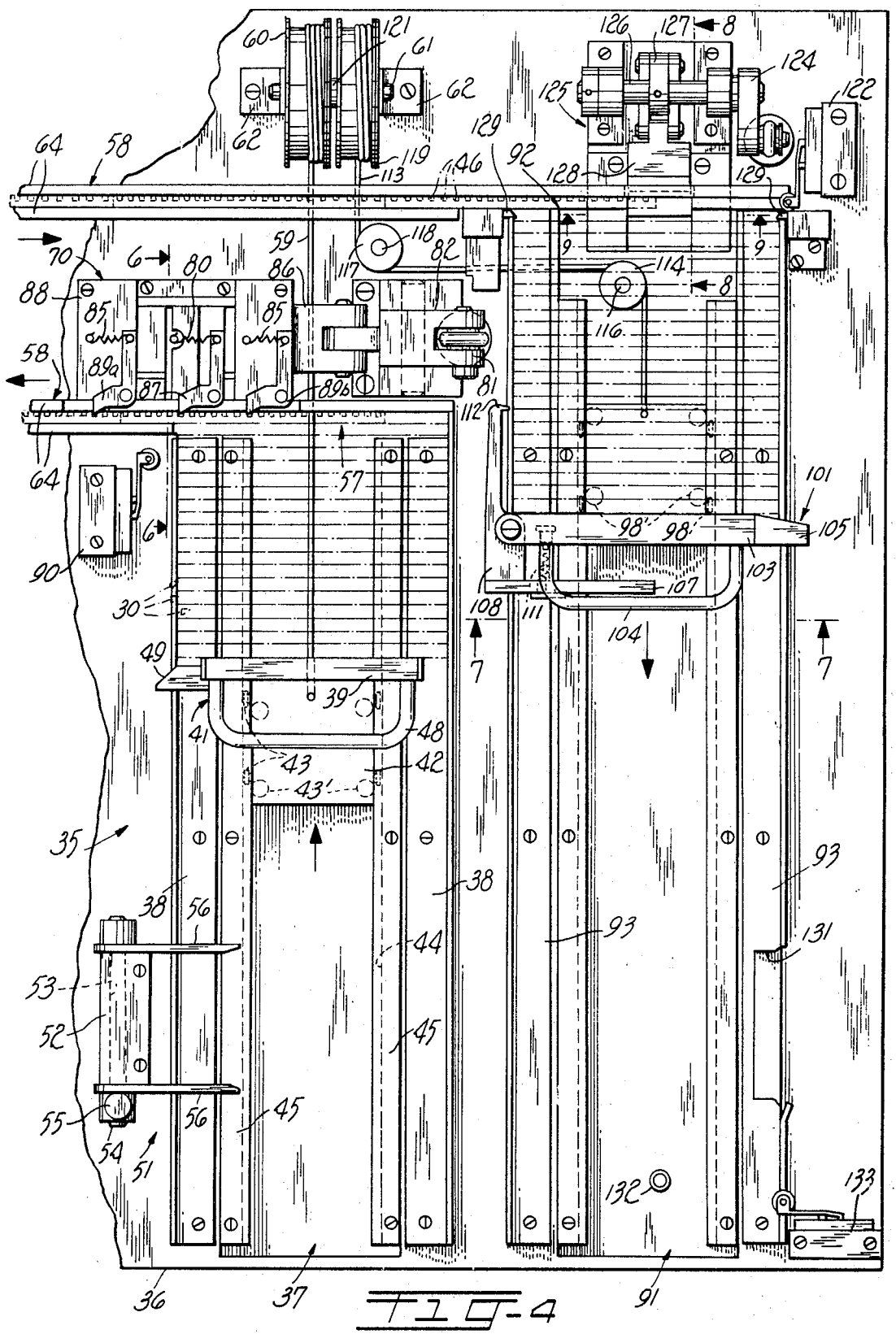

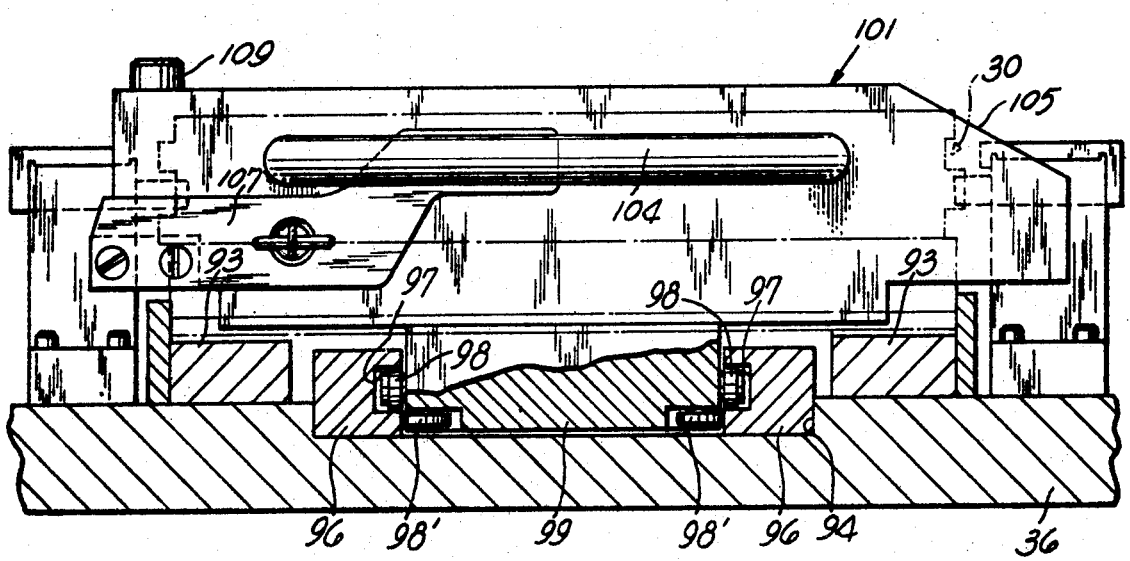
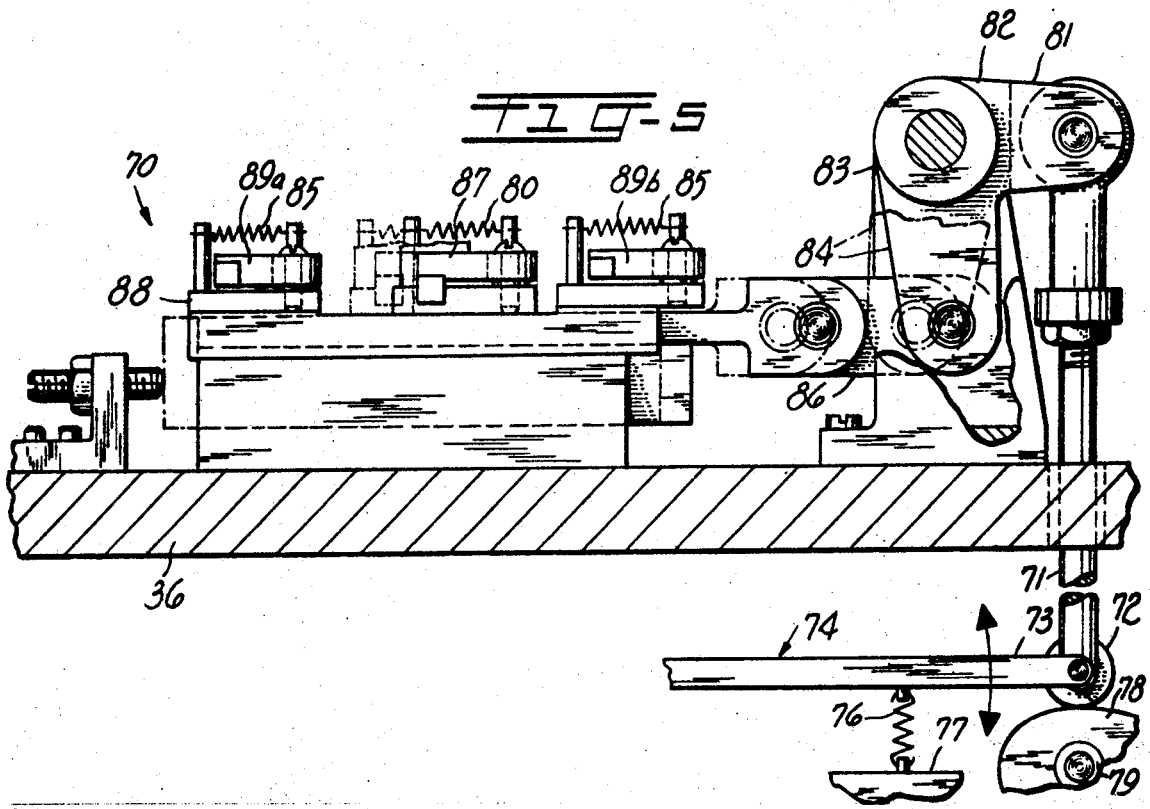

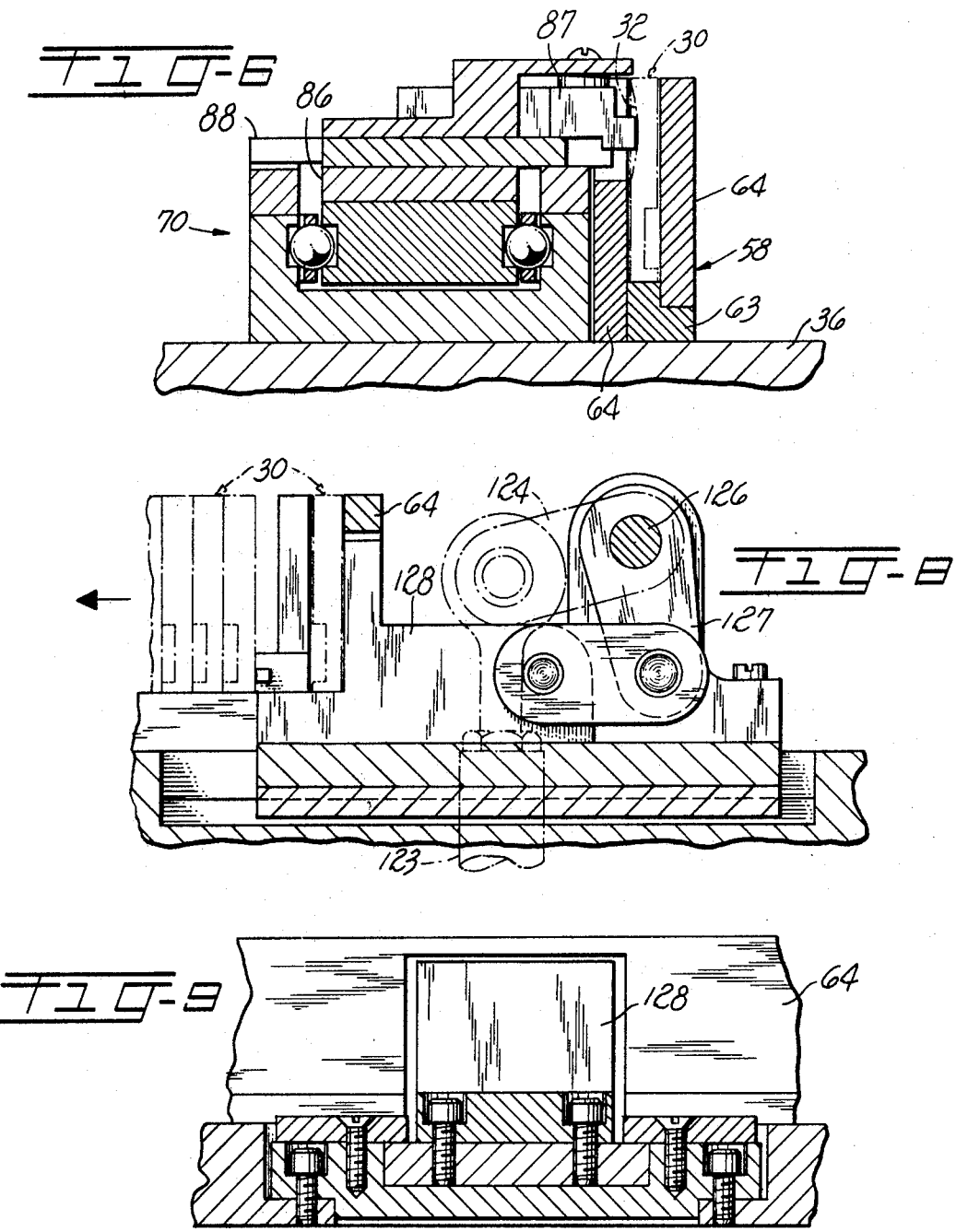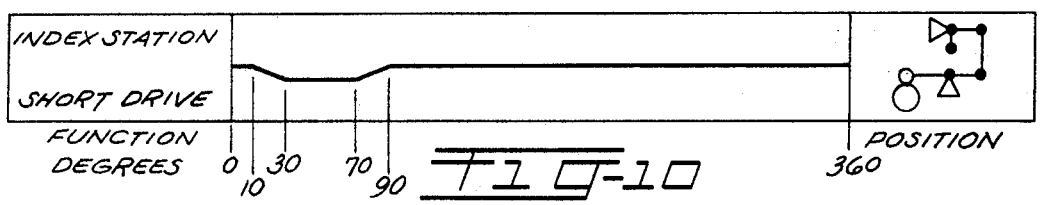

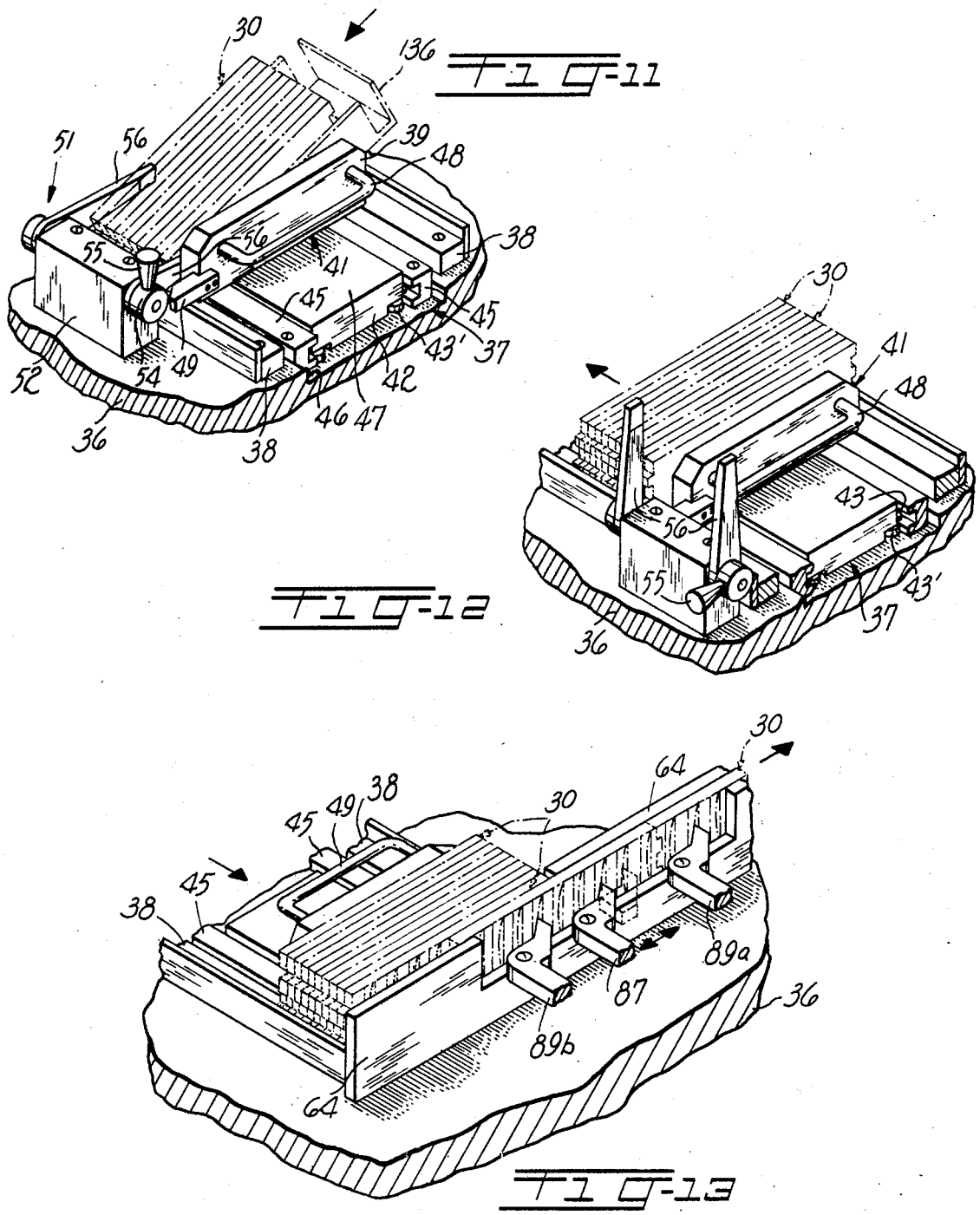

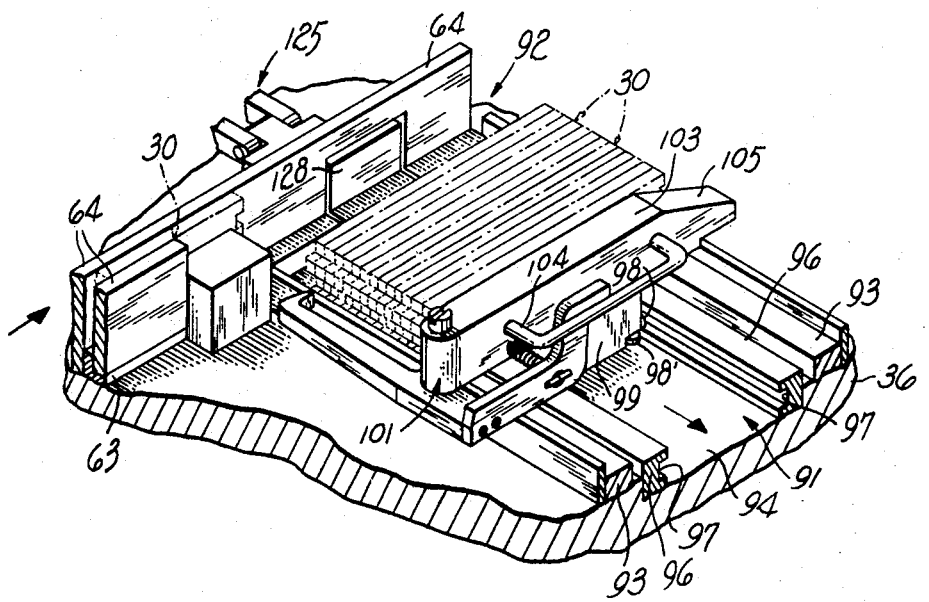
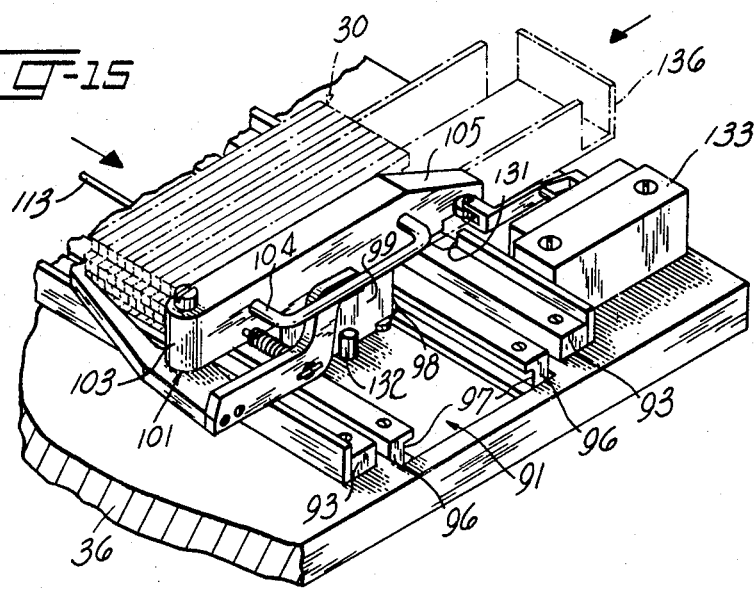

3,520,048
METHODS OF AND APPARATUS FOR LOADING AND UNLOADING GROUPS OF ARTICLES INTO AND FROM AN ASSEMBLY MACHINE
Werner F. Esseluhn, Wyomissing, and Charles R. Fegley, Laureldale, Pa., assignors to Western Electric Company, Incorporated, New York, N.Y., a corporation of New York
Filed June 17, 1968, Ser. No. 737,792
Int. Cl. B23p *11/00;* H05k *13/00*
U.S. Cl. 29—429                     16 Claims

ABSTRACT OF THE DISCLOSURE

Methods of an apparatus for loading groups of handling racks into a feeding device and then feeding each of the handling racks in seriatim into, through and then out of an assembly apparatus. As the handling racks emerge from the assembly apparatus, the handling racks are accumulated in an ordered mass at an unloading station, from which mass predetermined groups of the handling racks are engaged and removed therefrom.

BACKGROUND OF THE INVENTION

Field of the invention

This invention relates to methods of and apparatus for loading and unloading groups of articles into and from an assembly machine, and more particularly, to methods of and apparatus for feeding groups of handling racks into an assembly or utilization apparatus and for accumulating and then removing the handling racks in predetermined groups therefrom.

Description of the prior art

In the manufacture of microminiature electronic devices, first parts of the devices may be loaded into handling racks after which the handling racks are conveyed to fabrication stations in an assembly apparatus wherein operations are performed on the first parts or additional components are added to the first parts. Then the devices may be conveyed out of the fabrication stations and removed from the apparatus.

In one particular application, a plurality of devices are inserted into an apertured handling rack and the handling racks are moved in seriatim through the assembly apparatus. When the devices have been fabricated, the handling rack is moved out of the assembly apparatus to an unload station and removed therefrom. Most of the automatic assembly machines have high production capacities and it is important that that production capability is not detracted from by low rates of feeding into, or removal of handling racks from, the apparatus.

In the past, in machines of this general class handling racks loaded at other stations have been inserted singularly into the apparatus or very large groups of handling racks have been placed into a feeding position in the apparatus. This has generally been done without consideration being given to the optimum feeding arrangement for a particular machine. Moreover, an operator would be tied up almost constantly in loading and unloading the machine.

Accordingly, there is needed a method of and apparatus for loading and unloading a plurality of handling racks into a fabrication machine.

Furthermore, it is an object of this invention to load successively groups of handling racks into a feed device for movement into an assembly apparatus and for accumulating handling racks emanating from the assembly apparatus to facilitate removal of the handling racks in groups of a predetermined number.

SUMMARY OF THE INVENTION

With these and other objects in mind, the present invention contemplates methods of and apparatus for loading successively groups of handling racks into a continuously operated feed device of an assembly apparatus and for accumulating handling racks emanating from the assembly apparatus to facilitate removal of the handling racks in predetermined groups.

A method of loading successive groups of handling racks into a continuously operated feed device of a utilization apparatus wherein the handling racks are fed in seriatim through the utilization apparatus and then returned to an unload station where the handling racks are accumulated. Then an operator engages a predetermined number of handling racks and removes the predetermined number of handling racks from the apparatus.

Apparatus for loading and unloading a plurality of handling racks into and out of a fabrication apparatus in which a succession of groups of handling racks are received in a loading fixture and engaged by a slidably movable pusher device. The pusher device moves each group of handling racks into engagement with a continuously operated feed device at an input end of the apparatus and urges the handling racks thereagainst. Then the handling racks are fed in seriatim through the fabrication apparatus and then out of the fabrication apparatus at an output end and at an unload station. At the unload station, the handling racks are accumulated in an output stack. An operator intermittently engages and then withdraws successive groups of handling racks from the accumulated stack of handling racks in predetermined numbers. Then the operator places each successive group of handling racks in a tray and removes the tray from the apparatus.

BRIEF DESCRIPTION OF THE DRAWING

FIG. 1 is an elevational view, partially in section, of a completed diode assembly to which the principles of the methods of this invention are applied to load and unload groups of the diodes from a fabrication machine;

FIG. 2 is an exploded, elevational view, partially in section, and showing a case subassembly which is welded to a diode subassembly in order to manufacture the completed diode assembly in FIG. 1;

FIG. 3 is a perspective view showing a handling rack having a plurality of diode subassemblies supported thereon with upper portions thereof supported on a top surface of the handling rack;

FIG. 4 is a plan view of a loading and unloading apparatus which is used to carry out the principles of the methods of this invention to load groups of articles into a feed device for movement into a fabrication machine and for then unloading groups of articles as the articles are fed out of the fabrication machine;

FIG. 5 is a side elevational view, partially in section, of a feed or pick-off device which is used to move groups of articles into, through and then out of the fabrication machine;

FIG. 6 is an end view in section of the feed device shown in FIG. 5 and taken along lines 6—6 in FIG. 4;

FIG. 7 is a front elevational view of a loading carrier, as viewed along lines 7—7 in FIG. 4, which is used to remove articles which have been fed out of the fabrication machine in predetermined groups from the loading and unloading apparatus;

FIG. 8 is a side elevational view, partially in section, and taken along lines 8—8 in FIG. 4 of a mechanism for operating a ram to push a leading one of a plurality of handling racks 30 emanating from the fabrication machine from a conveyer track and onto a guideway;

FIG. 9 is a front elevational, detail view, partially in section, and taken along lines 9—9 in FIG. 4 of the ram and conveyer track;

FIG. 10 is a cam timing diagram showing cam contours for moving the feed devices to advance the handling racks into, through and then out of the fabrication machine; and FIGS. 11–15 are a series of views showing a sequence of operations using the methods and an apparatus for carrying out the principles of this invention to load groups of articles into the feed device for movement into, through and then out of the fabrication machine after which predetermined groups of the articles are removed from the apparatus.

DETAILED DESCRIPTION

Referring now to FIG. 1, there is shown a perspective view of a sealed diode assembly 19. The diode assembly 19 comprises a case subassembly, designated generally by the numerals 20, assembled to a diode subassembly, designated generally by the numerals 21 (see exploded view in FIG. 2). The case subassembly 20 comprises a diode casing 22 having a hollow, paramagnetic tubulation 23 extending from within a glass seal 24 in the casing and upwardly therefrom. A lower edge of the casing 22 is formed with a flange 25. The diode subassembly 21 comprises a semiconductor element 26 mounted on a platform made of a paragmagnetic material 27 and having a gold lead 28 extending upwardly therefrom and a stud lead 29 downwardly from the platform.

Referring now to FIG. 3, there is shown a handling rack 30 which supports a plurality of the diode subassemblies 21. Each of the handling racks 30 includes an elongated rack member 31 having a plurality of spaced, vertical grooves 32 formed along one side thereof. In addition, the rack member 31 has a plurality of vertical bores 33 formed therein with each of the bores opening into a top surface 34 of the elongated rack member. A plurality of the diode subassemblies 21 are loaded into the handling rack 30 with each of the stud leads 29 received in one of the bores 33. The stud leads 29 extend through the bores 33 and are supported on a lower portion of the rack member 31 to space the platforms 27 above the top surface 34 of the handling rack 30.

Referring now to FIG. 4, there is shown a plan view of an apparatus, designated generally by the numerals 35, for carrying out the principles of the method of this invention to load and unload groups of articles into and from a utilization machine. A plurality of the workholders 30, each having a plurality of diode subassemblies supported therein, are placed into a loading or grouping fixture, designated generally by the numeral 51. Then an operator disengages the loading fixture 51 from the group of workholders 30 to permit a tensioned cable 59 to pull the group of workholders along a loading guideway, designated generally by the numerals 37, toward an entrance end 57 of a conveyer track, designated generally by the numerals 58. As the group of workholders 30 are pulled toward the conveyer track 58, a leading one of the workholders is moved into engagement with a feed device, designated generally by the numeral 70. The feed device 70 advances successive workholders 30 into the utilization machine after which leading ones of the workholders emanate from the utilization machine and into registration with an exit end 92 of the conveyer track 58. A stacking device, designated generally by the numerals 125, accumulates the workholders 30 on an unloading guideway, designated generally by the numeral 91. Then a carrier fixture 101 is moved along the second guideway 91 to engage and hold a predetermined number of the workholders 30, and is then pulled away from the remaining workholders into alignment with an opening 131 in the guideway 91, whereat the predetermined number of workholders are removed from the apparatus 35.

The apparatus, designated generally by the numerals 35 (see FIG. 4) comprises a base plate 63 on which is mounted a loading guideway, designated generally by the numeral 37. The loading guideway 37 has a pair of spaced, parallel support rails 38 on which is supported a backboard plate 39 of a loading drawer, or pusher, designated generally by the numeral 41. A bottom slide 42 of the pusher 41 has a plurality of guide rollers 43 rotatably mounted on each lateral side thereof. The guide rollers 43 are received in longitudinal grooves 44 formed in a pair of spaced-apart guide rails 45 which are positioned between the support rails 38. Additional guide rollers 43' are mounted rotatably on lateral cut-away portions of the bottom slide 42 and ride along the lower, vertical surface of the guide rails 45 as the pusher 41 is moved within the guideway 37. The rollers 43 position the pusher 41 within the guideway 37 so as to permit sliding motion only of the pusher. The rollers 43 in the grooves 44 prevent vertical movement of the pusher 35 while the rollers 43' mounted in the cut-away portion of the bottom slide 42 prevent lateral motion or shimmying of the pusher.

The guide rails 45 are secured to the base plate 36 within a depressed way 46 formed in the base plate (see FIG. 11). The pusher 41 is arranged so that a top surface 47 of the bottom portion 42 is in the same plane as the top surfaces of the support rails 38.

The backboard plate 39 of the loading pusher 41 has a tubular, curved handle or grab bar 48 attached thereto by which an operator may slidably move the pusher 41 along the guideway 37. Moreover, the backboard plate 39 has a projecting portion 49 which extends out past the left-hand support rail 38, as viewed in FIG. 4.

The bottom surface of the bottom portion 42 of the pusher 41 is spaced above the top surface of the depressed way 46 of the base plate 36 to reduce friction as the pusher 41 is moved within the guideway 37. As the pusher 41 is moved along the guideway 37, the pusher is used to move groups of the workholders or handling racks 30 which are placed transversely across and are supported on the rails 38.

In order to assist loading the predetermined number of handling racks 30 against the pusher 41, a loading fixture 51 is provided (see FIGS. 4 and 11). The loading fixture 51 is attached to the top surface of the base plate 36 and comprise a stationary block 52 having a horizontal passageway 53 formed therethrough. A pintle 54, having a handle 55 secured to one end thereof, is rotatably mounted in the passageway 53 and is secured laterally within the passageway 53 by a pair of arms 56, each one of which is securely mounted to one end of the pintle 54. The arms 56 are securely mounted on the pintle 54 so that as the pintle is rotated clockwise, as viewed in FIG. 11, the arm members move together in the some plane and span across the guideway 37.

During the time in which an operator positions a group of handling racks 30 in the loading fixture 51, the pusher 41 is adjacent one of the arms 56, as shown in FIG. 11. The loading fixture 51 serves to restrain the pusher 41 from being pulled away from the operator and toward an entrance or input end 57 of a track, designated generally by the numerals 58, by a cable 59 that is attached at one end to the underside of the pusher 41 and the other end of which is wound on a spring-loaded reel 60. The spring-loaded reel 60 is located on that side of the base plate 36 furtherest from the operator (see FIG. 4). The reel 60 is rotatably mounted on a shaft 61 which is supported in a pair of spaced bearing blocks 62.

The conveyor track 58 includes a bed plate 63 which is secured to the base plate 36 (see FIG. 6). A pair of upstanding, vertical side plates 64 are mounted on the bed plate 63 to form a channel track along which the handling racks 30 are to be moved, end to end, into, through, and then out of, an assembly or utilization machine.

In order to advance the handling racks 30 along the track 58, a continuously-operated feed device, designated generally by the numerals 70, is position adjacent the track 58 (see FIG. 4). The feed device 70 comprises a push rod 71 (see FIG. 5) which extends through the base plate 36 and is attached to a follower 72. The follower 72 is rotatably mounted at one end 73 of a lever 74. The one end of the lever 74 is urged downwardly, as viewed in FIG. 5, by a tension spring 76 which is attached to the one end of the lever 74 and to a frame 77 of the apparatus 35. The follower 72 engages a cam 78 which is mounted on a cam shaft 79, so that as the cam shaft is turned to rotate the cam, the follower is moved to follow the contour of the cam and raise and lower the lever 74 (see FIGS. 5 and 10).

The upper end of the push rod 71 is pinned to to a forked end 81 of a crank lever 82. The crank lever 82 is mounted pivotally in an upright standard 83 and has a lower end 84 pinned to a slider 86. In order to index the handling racks 30, the slider 86 is mounted for reciprocatory movement and has attached thereto an indexing pawl 87. The pawl 87 engages with one of the vertical grooves 32 in the side of the handling rack adjacent the indexing mechanism to advance the handling rack. The pawl is biased in a counterclockwise direction, as viewed in FIG. 4, by a tension spring 80.

Moreover, a plate 88 is fixedly attached to the base plate 36 and is positioned above the slider 86. A pair of spaced, antiretrograde pawls 89a, and 89b are positioned on the plate 88, one on each side of the indexing pawl 87 and are mounted for pivotal movement only. Each of the pawls 89a and 89b are biased in a counterclockwise direction, as viewed in FIG. 4, by a tension spring 85.

As can be seen in FIG. 4, a limit switch 90 is positioned adjacent the guideway 37. When the number of handling racks 30 supported on the loading guideway 37 has been diminished to a predetermined number, the projecting portion 49 of the backboard plate 39 of the pusher 41 engages the switch 90 to energize an electrical circuit (not shown) and discontinue operation of the apparatus 35 until the operator has replenished the supply of handling racks.

In order to follow the flow of the handling racks 30 as the handling racks are advanced into and through the assembly apparatus, reference is made to FIG. 4. The handling racks 30, loaded with diode subassemblies 21, are moved to the left to a transfer station (designated 30 in U.S. Pat. No. 3,407,949, issued Oct. 29, 1968) whereat the diode subassemblies are transferred from the handling racks to welding racks (designated 20 in U.S. Pat. No. 3,407,949, issued Oct. 28, 1968). Simultaneously, completed diode assemblies 19 are transferred from the welding racks to the handling racks 30.

Then the handling racks 30 are advanced to a crossfeed station (as shown in U.S. Pat. No. 3,407,949, issued Oct. 29, 1968) where the handling racks are moved transversely toward the rear of the assembly apparatus. Another feed device, identical to feed device 70 and operated off the same cam shaft 79, indexably moves the handling racks 30, now loaded with completed diode assemblies 19, back toward the load and unloading station for removal from the apparatus 35.

As the leading one of the handling racks 30 energes from the apparatus, and having a plurality of completed diode assemblies 19, the handling rack is moved into approximate registration with a guideway, designated generally by the numerals 91 (see FIG. 4). The guideway 91 is substantially identical to the guideway 37, but extends further to the rear of the base plate 36 and toward an exit end or opening 92 in the track 58 (see FIG. 14), and comprises a pair of spaced-apart, parallel support rails 93 (see FIG. 4). Moreover, the base plate 36 is formed with a longitudinal, depressed portion 94 intermediate the support rails 93 for receiving a second pair of spaced, parallel guide rails 96 (see FIG. 7). The guide rails 96, like the guide rails 45, each have a longitudinal slot 97 formed in a side, vertical surface thereof for receiving guide rollers 98 rotatably mounted on side surfaces of a bottom portion 99 of an unloading carrier or carrier fixture 101. The carrier 101 is also slotted along opposed, bottom edges to provide mountings for rollers 98' which bear against the sides of guide rails 97 to prevent the carrier from cocking and binding against the guide rails.

Referring now to FIG. 7, the carirer 101 is formed with the bottom portion 99 dimensioned to support a predetermined number of handling racks 30. Also, the top surface of the bottom portion 99 is in a plane slightly higher than the top surfaces of the support rails 93. The bottom portion 99 of the carrier 101 is also formed with a bevelled front edge (not shown) along the top surface thereof. The carrier 101 also has a retaining plate 103 to which is attached a tubular handle 104 by which an operator may move slidably the carrier along the guideway 91.

As is shown in FIGS. 4 and 7, a lever 107 is attached to a latch 108 which is mounted rotatably on a pin 109 on the carrier 101. The lever 107 and latch 108 are biased in a counterclockwise direction by a spring 111 located under the tubular handle 104 and connected to the lever and the retaining plate 103. A free end of the latch 108 has a toothed portion 112 which is moved between ends of adjacent handling racks 30 on the guideway 91 when the latch 108 is moved in a clockwise direction, as viewed in FIG. 4.

The unloading carrier 101 is constantly urged toward the opening 92 in the side wall 64 of the conveyer 58 by a second cable 113 (see FIGS. 4 and 15). The second cable 113 is attached to the bottom portion 99 of the carrier 101 and then wound around the periphery of a pulley 114 which is rotatably mounted on a vertical pin 116 attached to the base plate 36. The cable 113 then is guided around a second pulley 117 which is mounted rotatably on a pin 118. The cable 113 is continued around pulley 117 and wound on a second spring-loaded reel 119. The second spring-loaded reel 119 is also rotatably mounted on the shaft 61 and is prevented from engaging the first reel 60 by a spacer-washer 121.

A leading end of the emerging handling rack 30 engages a limit switch 122 (see FIG. 4) which actuates an air cylinder located beneath the base plate 36. The actuation of the air cylinder moves a piston to drive a push rod 123 upwardly through the base plate 36 (see FIG. 8). As the push rod 123 is moved upwardly, as viewed in FIG. 8, the push rod which is pinned to a link 124 rotates the link clockwise, as viewed in FIG. 8, to rotate a shaft 126 and actuate a stacking device, designated generally by the numeral 125. As the shaft 126 is rotated, a second link 127 which is fixedly mounted on the shaft is pivoted clockwise. The second link 127 is pinned to a forked end of a ram 128 (see FIGS. 8 and 9) so that as the link 127 is pivoted clockwise, as viewed in FIG. 8, the ram 128 is moved through an opening in the rear wall 64 of the conveyer track 58 and into engagement with the leading one of the handling racks 30 which is adjacent the guide rails 93 (see FIG. 14).

The ram 128 pushes successive ones of the handling racks 30, now loaded with diode assemblies 19, through the opening 92 in the wall 64 of the conveyer to accumulate and again arrange the handling racks in a stack on the support rails 93 of the guideway 91 (see FIG. 14). As the ram 128 pushes each handling rack 30 over the support rails 93, a pair of spring-biased latching pawls 129 are depressed and then are urged upwardly to hold the rack on the guideway 91 against the retaining plate 103.

Moreover, it should be noted that the right-hand support rail 93, as viewed in FIG. 4, has an opening 131 formed therein. It is at this location that the operator removes a predetermined number of handling racks 30 which have been moved through the general assembly apparatus and received assembled case assemblies and which have been withdrawn from the accumulated handling racks on the carrier fixture 101. A stop post 132 projecting upwardly from and attached to the base plate 36 acts to halt the movement of the carrier fixture 101 and automatically position the carrier fixture in alignment with the opening 131 (see FIG. 15).

In addition, a limit switch 133 (see FIGS. 4 and 15), is positioned adjacent the right-hand support rail 93, as viewed in FIG. 4, adjacent the opening 131. As the carrier 101 is moved into alignment with the opening 131, the projecting portion 105 of the retaining plate 103 on the carrier engages the limit switch 133. The limit switch 133 interrupts an electrical circuit (not shown) to discontinue feeding of the handling racks 30 out of the assembly apparatus. After the operator has removed the predetermined number of handling racks currently on the carrier fixture 101, the operator moves the carrier fixture toward the remaining stack of handling racks. As the operator moves the carrier 101, the projecting portion 105 releases the limit switch 133 to again complete the electrical circuit and resume operation of the feed device 70.

OPERATION

In the operation of the apparatus 35 to carry out the principles of the method of the invention, the operator obtains a tray 136 preloaded with a group of handling racks 30 (see FIG. 11). Each of the handling racks 30 has been priorly loaded with a plurality of diode subassemblies 21 with the semiconductor element 26 supported on a top surface 34 of the handling rack and with the gold leads 28 extending upwardly therefrom.

The operator grasps the handle 48 and moves the pusher 41 along the loading guideway 37 into approximate registration with the loading fixture 51. Then the operator grasps and turns the handle 55 and moves the handle to move rotatably the pintle 54 and swing the arms 56 over the loading guideway 37 to engage one of the arms with the backboard plate 39 of the loading pusher 41 (see FIG. 11).

It should be apparent from FIGS. 4 and 11 that the engagement of the arms 56 with the backboard plate 39 of the loading pusher 41 prevents the pusher from being pulled toward the feed device 70 by the spring-biased reel 60 and cable 59. In this way, an operator then moves the loading pan or tray 136, generally having a predetermined number of handling racks 30, over the loading guideway 37 and slides the handling racks 30 as a unit from the tray onto the top surface of the support rails 38 and between the arms 56 of the loading fixture 51. Then, when the handling racks 30 have been placed into the loading fixture 51, the operator moves the handle 55 and rotates the pintle 54 to move the arms 56 in a counterclockwise direction, as viewed in FIG. 12, to move the arms out of engagement with the handling racks 30. Simultaneously, the operator continues to grasp the handle 48 of the pusher 41, but gradually diminishes the holding force on the handle so that the pusher is urged rearwardly toward the entrance end 57 of the conveyor track 58 by the cable 59 taken up on the spring-loaded reel 60.

As the pusher 41 is urged to the rear of the apparatus 35, the handling racks 30 are moved slidably along the support rails 38 until the handling racks are abutted against other handling racks still on the support rails to then urge the rearwardmost handling rack into position over the track 58. Alternately, if there are no other handling racks, priorly placed and now remaining on the guideway 37, the rearwardmost handling rack 30 of the predetermined number of handling racks placed on the support rails 38 is urged by the pusher 41 until positioned over the track 58.

At the entrance end 57 of the track 58, the indexing pawl 87 engages with the left-most vertical groove 32, as viewed in FIG. 4, in that handling rack now on the bed plate 63. The pawl 89a is not yet in engagement with any of the grooves 32 on the leading handling rack 30 on the guideway and presently in position for advancement along the conveyor track.

The feed device 70 which advances the handling racks 30 from the input end 57 of the conveyor into the assembly apparatus, is actuated by the rotation of the cam shaft 79. As the cam shaft 79 rotates, the follower 72 is raised to exert an upward force against the one end 73 of the lever 74. The lever 74 pushes the push rod 71 upwardly through the base plate 36 to rotate the crank lever 82 counterclockwise, as viewed in FIG. 5. The crank lever 82 moves the slider plate 86 to the left, as viewed in FIG. 5, to move the indexing pawl 87 and hence, the leading handling rack 30 slidably along the bed plate 63 toward the assembly apparatus (see FIG. 13). As the handling rack 30 is advanced to the left, as viewed in FIG. 4, the toothed portion of the pawl 89a is moved pivotally out of the path of the handling rack after which the pawl 89a is urged in a counterclockwise direction by the tension spring 85 to engage the toothed portion with one of the grooves 32 therein. The pawl 89b is disengaged from the handling rack 30 as the slider plate 88 is moved a number of strokes, first to the left, then to the right, as viewed in FIG. 4, and is in position to engage a groove in the next successive handling rack 30 in the guideway 37 to prevent retrograde movement of the rack as the pawl 87 is moved back in anticipation of the next feed stroke. The pawl 89a also acts to prevent retrograde movement of the leading handling rack 30, now well within the conveyor track 58 (see FIG. 13).

The spring-biased reel 60 rewinds additional cable 59, attached to the underside of the loading pusher 41, to constantly press against the handling racks 30, which are supported on the guide rails 38, toward the feed device 70 to move the leading one of the groups of handling racks over the bed plate 63 for movement into the assembly apparatus.

The pusher 41 engages the limit switch 90 to disable the fed device 70 when there remains on the guideway 37 a predetermined number of handling racks 30. It will be observed from FIG. 11 that the bottom portion 42 of the pusher 41 extends from the backing plate 39, along the guide rails 45 away from the conveyer track 58. In this way, the pusher 41 may be moved toward the conveyor track 58 and the extending portion 49 into engagement with the limit switch 90 without interference by the bottom portion 42. Then, the operator exerts a pulling force on the handle 48 to urge the pusher 41 back toward the loading fixture 51 to receive another batch of handling racks 30 loaded with diode subassemblies 21.

The handling racks 30 are then moved through the assembly apparatus to a transfer station such as that described in U.S. Pat. No. 3,407,949, issued Oct. 29, 1968, whereat the diode subassemblies from the handling racks 30 are transferred to welding racks (designated 31 and 20, respectively, as shown in U.S. Pat. 3,407,949, issued Oct. 29, 1968). Simultaneously, at the transfer station, completed diode assemblies 19 are transferred from welding racks to the now empty handling racks 30. Then the handling racks 30, which have been loaded with completed diode assemblies 19, are moved through the assembly apparatus and back toward the unloading apparatus 35.

As the leading one of the handling racks 30 emerges from the apparatus, and having a plurality of completed diode assemblies 19, the handling rack is moved into approximate registration with the guideway 91 with the handling rack transverse of and adjacent the support rails 93. At that time, a leading end of the handling rack 30 engages the limit switch 122 (see FIG. 4) which actuates the air cylinder located beneath the base plate 36. The actuation of the air cylinder moves a piston to drive the push rod 123 upwardly through the base plate 36. As the push rod 123 is moved upwardly, as viewed in FIG. 8, the push rod, which is pinned to the link 124, rotates the link clockwise, as viewed in FIG. 8, to rotate the shaft 126. As the shaft 126 is rotated, the second link 127, which is fixedly mounted on the shaft, is pivoted clockwise. The second link 127, pinned to the forked end of the ram 128, is pivoted clockwise, as viewed in FIG. 8, and moves the ram 128 through a rear wall 64 of the conveyer track 58 and into engagement with the leading one of the handling racks 30 which is now adjacent the guide rails 93.

The ram 128 then moves the leading one of the handling racks 30 onto the support rails 93 and over the pair of spring-biased latch pawls 129 (see FIG. 4) to and against the retaining plate 103 of the carrier 101. Moreover, the movement of the handling rack 30 onto the support rails 93 displaces the unloading carrier 101 along the guideway 91 and toward the front of the apparatus. The air cylinder is then operated to retract the piston and move the push rod 123 downwardly to rotate the links 124 and 127 and withdraw the ram 128 through the back wall of the conveyer track 58. As the ram 128 is withdrawn from engagement with the leading one of the handling racks 30, the handling rack is maintained in position across the support rails 93 by the latching pawls 129. Moreover, since the carrier 101 is biased toward the conveyer track 58 by the spring-biased reel 119, the handling rack 30 is confined between the latching pawls 129 and the retaining plate 103.

This cycle of operation is repeated and the handling racks 30, having completed diode assemblies 19, are accumulated transversely of the support rails 93 to form a stack in the second guideway 91 between the latching pawls 129 and the retaining plate 103.

Then the operator presses against the lever 107, biased in a counterclockwise direction by the spring 111 and located under the tubular handle 104 of the carrier 101 to rotate the latch 108 in a clockwise direction, as viewed in FIGS. 4 and 14, about the pin 109 on one end of the retainer plate 103. As the latch 108 is moved pivotally about the pin 109, the forward end of the latch 108, having the toothed portion 112, is moved between an adjacent pair of handling racks 30. This secures a predetermined number of handling racks 30 between the toothed portion 112 of the latch 108 and the retainer plate 103 to effectively load the predetermined number of handling racks on the carrier 101.

Then the operator, while maintaining a force against the lever 107 to maintain the latch 108 in operative condition, pulls on the tubular handle 104 to move the predetermined number of handling racks 30 along the support rails 93 away from the accumulated stack of handling racks. The operator slides the carrier 101 toward a front part of the apparatus 35 until the bottom portion 99 engages the post 132. The predetermined number of handling racks 30 are now in registration with a cutaway portion 131 of the outer support rail 93 of the second guideway 91 (see FIG. 4). At the same time, the projecting portion 105 of the retaining plate 103 engages and holds the limit switch 133 to disconnect an electrical current (not shown) and interrupt operation of the feed devices 70.

Then, the operator, while maintaining the carrier 101 in engagement with the alignment pin 132 which protrudes from the base plate 36, grasps the loading pan 136 and moves the load pan under the predetermined number of handling racks 30, now adjacent the opening 131. Then the operator removes the pan 136, together with the predetermined number of handling racks, from the load and unload station and then releases the holding force exerted through the tubular handle 104 on the carrier 101 to permit the spring-biased reel 119 to pull the carrier rearwardly toward and into engagement with the remaining plurality of handling racks 30. When the carrier 101 is moved toward the exit end 92 of the apparatus 35 to receive additional handling racks 30 which emerge from the assembly apparatus and which are straddled across the support rails 93, the bevelled edge (not shown) of the bottom portion 99 moves under the forwardmost or leading one of the handling racks to facilitate the loading of the carrier.

After the operator has removed the predetermined number of handling racks 30 currently on the carrier 101, the operator moves the carrier toward the remaining stack of handling racks. As the operator moves the carrier 101, the projecting portion 105 releases the limit switch 133 to again complete the electrical circuit and resume operation of the feed device 70.

This cycle of operation is repeated with the operator loading a predetermined number of handling racks on the loading guideway 37 and removing a predetermined number of handling racks through the cutout portion 131 of the unloading guideway 91.

It is to be understood that the above-identified embodiments are simply illustrative of the principles of the invention and numerous other modifications may be devised without departing from the spirit and scope of the invention.

What is claimed is:

1. In a method of loading and unloading groups of article handling racks into a feed device for movement into and out of a utilization machine;
   accumulating a first group of handling racks;
   advancing each first group of handling racks onto a first stack of handling racks;
   withdrawing the handling racks individually from the first stack and feeding said handling racks through the utilization machine;
   individually moving handling racks which have been moved through said utilization machine onto a second stack of handling racks; and
   removing second groups of handling racks from the second stack.

2. In a method of loading and unloading groups of handling racks into and out of a utilization machine as set forth in claim 1 and further including:
   interrupting the operation of said utilization machine upon the first stack of handling racks reaching a predetermined level of depletion.

3. In a method of loading and unloading groups of holding racks into and then out of a utilization machine as set forth in claim 2 and further including:
   interrupting operation of the utilization machine upon a preconcerted number of handling racks being accumulated in the second stack of handling racks.

4. In an article storage device associated with a continuously operating fabricating machine;
   track means for supporting an accumulation of articles utilized by the machine;
   a carrier, movably mounted on said track means;
   means for moving the carrier relative to the track means to bear against an accumulation of articles positioned on the tracks; and
   means operated by a predetermined movement of the carrier relative to the track means for interrupting operation of the fabricating machine.

5. In an apparatus for loading handling racks into a feed device for movement into a utilization machine and for unloading handling racks which are moved out of said utilization machine;
   input means receiving and supporting groups of said handling racks for moving said handling racks into engagement with said feed device;
   means urging said groups of handling racks along said supporting means for feeding successively each of the handling racks into said feed device;
   means responsive to the movement of said handling racks from said utilization machine for accumulating said handling racks and for arranging said handling racks in a stack; and
   means moved into engagement with said accumulated handling racks for engaging and withdrawing a predetermined number of said handling racks from said stack.

6. In an article storage device associated with a continuously operating utilization machine;

a pair of tracks for supporting an accumulation of articles;

means for feeding articles on one of said tracks into the machine and for feeding articles emanating from the machine onto the other of said tracks;

a carrier movably mounted on each of said tracks;

means for moving the carrier relative to the tracks to bear against an accumulation of articles positioned on the tracks; and means operated by a predetermined movement of the carrier relative to the tracks for interrupting operation of the utilization machine.

7. In an apparatus for holding and guiding a plurality of handling racks for movement into a utilization machine;

guide means for supporting a plurality of handling racks arranged in a stack;

means for incrementally varying the number of handling racks in said stack;

pivotally mounted means for engaging a predetermined number of said handling racks;

means for pivoting said pivotally mounted means out of engagement with said predetermined number of said handling racks;

means slidably mounted in said guide means for moving said predetermined number of handling racks relative to said varying means; and means attached to said slidably movable means for urging said slidably movable means toward said varying means.

8. In a loading and unloading apparatus for holding and guiding a plurality of handling racks for movement relative to a continuously operated feed device having an input end and an output end and which feeds said handling racks into and out of a utilization machine;

means for receiving and supporting said handling racks;

a pusher slidably mounted in said receiving and supporting means;

means urging said pusher toward said input end of said feed device for urging a leading one of said handling racks in engagement with said feed device;

means for accumulating said handling rack at said output end of said feed device;

carrier means for engaging a predetermined number of said accumulated handling racks; and means pivotally mounted on said carrier means for holding said predetermined number of handling racks on said carrier means.

9. In an apparatus for holding and guiding a plurality of handling racks into a feed device for movement into a utilization machine;

a pair of guide rails spaced apart to receive and support a plurality of handling racks;

a pusher slidably mounted on said guide rails;

a holder pivotally mounted and having an arm movable into engagement with the last of a group of handling racks abutted against said pusher;

means for pivoting said holder to move said arm from engagement with said last of said handling racks;

a cord engaging said pusher; and means for applying a force to said card to move said pusher to urge the handling racks to move along the guide rails.

10. In an apparatus at a load and unload station for feeding articles supported in workholders into and from a feed device which moves the workholders from the load station into and through an assembly machine and then out of the assembly machine to the unload station;

pivotally mounted means for receiving and holding a predetermined number of workholders spaced from said feed device;

means for supporting said workholders for transverse movement toward said feed device;

means for moving pivotally said receiving and holding means out of engagement with said workholders;

means rendered effective by the release of said holding means for urging said workholders along said supporting means toward said feed device to position successive leading ones of said workholders in engagement with said feed device;

guide means for accumulating said workholders as said workholders are moved out of said machine;

means responsive to a leading one of said workholders moved out of said assembly machine and into registration with said guide means for moving laterally said leading one of said workholders onto said guide means; and means for engaging and removing a predetermined number of said workholders which are accumulated on said guide means.

11. In an apparatus for holding and guiding a plurality of first handling racks loaded with subassembly units into a continuously operated feed device for movement into an assembly apparatus wherein the subassembly units are transferred to second handling racks and completed units are transferred from said second handling racks to said first handling racks which are then moved from said apparatus, the improvement comprising:

input means for supporting a plurality of said first handling racks arranged in a stack in lateral, abutting, parallel relationship with each other;

means urging said stack toward said feed device and engaging each successive leading one of said first handling racks with said feed device for feeding said leading one of said first handling racks into said assembly apparatus in end-to-end abutting relationship with each other;

means rendered effective by the emergence of each of said first handling racks from said apparatus for moving a leading one of said first handling racks transversely to again arrange said first handling racks in a stack in abutting, parallel relationship with each other; and means moved into engagement with said stack for engaging a predetermined number of said first handling racks and for withdrawing said predetermined number of first handling racks from said stack.

12. In an apparatus for loading and unloading groups of articles to and from a utilization machine;

an elongated guide means for supporting said articles to move into said utilization machine;

a loading fixture movably mounted and having a pair of arms spanning said guide means for receiving a first group of articles therebetween;

a pusher acting on said articles received between said arms; and means for moving said loading fixture to remove said arms from said group of articles to render said pusher effective to advance said group of articles along said guide means and toward said utilization machine.

13. In an apparatus for loading and unloading groups of articles to and from a utilization machine;

an elongated guide means for supporting articles received from the utilization machine and having a discharge opening formed therein;

a carrier fixture slidably mounted on said guide means;

means for urging the carrier fixture along the guide means against said articles being received from said utilization machine;

a jaw pivotally mounted on said carrier fixture and extending forwardly thereof along one side of said guide means;

means for urging said jaw to grip a group of articles emanating from said utilization machine;

means for sliding the carrier fixture to move a gripped group of articles along said guide means and into registration with said discharge opening; and means for releasing said jaw.

14. In an apparatus for loading and unloading groups of articles to and from a utilization machine;

an elongated guide means for supporting said articles to move into said utilization machine;

a loading fixture movably mounted and having a pair of arms spanning said guide for receiving a first group of articles therebetween;

a pusher acting on said articles received between said arms;

means for moving said loading fixture to remove said arms from said group of articles to render said pusher effective to advance said group of articles along said guide means and toward said utilization machine;

a second elongated guide means parallel to the first guide means for supporting articles received from the utilization machine;

a carrier fixture slidably mounted on said second guide means;

means for urging the carrier along the guide means against said articles being received from said utilization machine;

a jaw pivotally mounted on said carrier and extending forwardly thereof along one side of said second guide means;

means for urging said jaw to grip a group of articles emanating from said utilization machine;

means for sliding the carrier to move a gripped group of articles along said guide means; and means for releasing said jaw.

15. In an apparatus for loading and unloading handling racks each supporting a plurality of articles into and out of a feed device having an input end and an output end and which feeds said handling racks into and out of a utilization machine;

a pair of spaced-apart guide means for supporting a plurality of said handling racks transverse of said guide means;

a pair of spaced arms mounted rotatably for movement over said guide means to receive and hold a group of said handling racks placed across said guide means;

a loading pusher slidably mounted in said guide means and having an upstanding portion engaging one of said arms;

a cord engaging said pusher;

means attached to said loading pusher and rendered effective when said arms are rotated to disengage said one arm from said upstanding portion of said pusher for applying a force to said cord to move said pusher toward said feed device and position a leading one of said workholders over said input end of said feed device;

means for receiving said handling racks at said output end;

means actuated by a leading one of said handling racks moved to said output end and into registration with said receiving means for transferring said leading one of said handling racks from said conveyor to said receiving means;

carrier means urged toward said output end and slidably mounted in said receiving means for engaging a predetermined number of handling racks; and means mounted on said carrier means for moving said carrier means and said predetermined number of handling racks along said receiving means away from said output end of said feed device and out of said apparatus.

16. In a utilization machine, apparatus for loading handling racks into and for unloading handling racks from a continuously operated feed device;

a first pair of spaced-apart rails for supporting a plurality of said handling racks;

a first guideway positioned intermediate said first pair of spaced-apart rails;

a loading pusher received in said first guideway and supported on said rails and having a gripping handle mounted thereon;

a cord engaging said loading pusher;

a loading fixture having a pair of pivotally mounted, spaced arms spanning said rails for engaging and holding said pusher away from said feed device to permit loading of said handling racks on said support rails between said arms;

means rendered effective by the movement of said arms out of engagement with said handling racks for applying a force to said cord to move said loading pusher and urge said handling racks along the guide rails toward said feed device;

means actuated by said pusher for interrupting operation of said utilization machine when said handling racks on said first guideway are depleted beyond a predetermined number;

a second pair of spaced-apart rails parallel to and spaced from said first pair of rails for receiving said handling racks as handling racks emerge from said utilization machine with one of said rails having an opening formed therein;

a second guideway positioned intermediate said second pair of spaced-apart rails;

means responsive to the emergence of each of said handling racks for moving the handling racks to form a stack thereof on said second pair of spaced-apart rails;

an unloading carrier received in said second guideway and having a bevelled leading portion to facilitate movement under said stack of handling racks;

means for biasing said unloading carrier toward said feed device and into engagement with said stack of handling racks;

a holder pivotally mounted on said unloading carrier and having a pawl movable into engagement with the last of a group of predetermined number of handling racks abutted against said carrier;

means for moving said carrier and predetermined number of handling racks along said second guide rails away from said feed device into alignment with said opening in said one of said second rails;

means rendered effective by the movement of said predetermined number of handling racks into alignment with said opening for interrupting operation of said utilization machine; and means for pivoting said holder to move said pawl from engagement with said last of said handling racks.

References Cited

UNITED STATES PATENTS

| | | | |
|---|---|---|---|
| 2,739,558 | 3/1956 | Bieg | 29—203 |
| 3,283,398 | 11/1966 | Andren | 29—630 |
| 3,367,014 | 2/1968 | Suverkropp | 29—203 |
| 3,414,962 | 12/1968 | Attamura | 29—203 |

THOMAS H. EAGER, Primary Examiner

U.S. Cl. X.R.

29—203, 592, 630; 198—221; 214—7